United States Patent
Biagini

(10) Patent No.: US 9,677,402 B2
(45) Date of Patent: Jun. 13, 2017

(54) WIND MACHINE WITH AERODYNAMIC ELEMENTS TO CONCENTRATE AND ACCELERATE AN AEOLIAN FLOW ENTERING FROM OUTSIDE

(71) Applicant: Livio Biagini, Paglieta (IT)

(72) Inventor: Livio Biagini, Paglieta (IT)

(*) Notice: Subject to any disclaimer, the term of this patent is extended or adjusted under 35 U.S.C. 154(b) by 849 days.

(21) Appl. No.: 13/924,597

(22) Filed: Jun. 23, 2013

(65) Prior Publication Data

US 2013/0280058 A1    Oct. 24, 2013

Related U.S. Application Data

(63) Continuation of application No. PCT/IT2011/000412, filed on Dec. 22, 2011.

(30) Foreign Application Priority Data

Dec. 23, 2010  (IT) .............................. RM2010A0686

(51) Int. Cl.
 *F03D 1/04* (2006.01)
 *F01D 1/02* (2006.01)
 (Continued)

(52) U.S. Cl.
 CPC .................. *F01D 1/02* (2013.01); *F03D 1/02* (2013.01); *F03D 1/04* (2013.01); *F03D 3/02* (2013.01);
 (Continued)

(58) Field of Classification Search
 CPC ... F03D 1/04; F03D 1/03; F03D 1/427; F03D 1/409; F03D 1/454; F03D 1/445;
 (Continued)

(56) References Cited

U.S. PATENT DOCUMENTS

| | | | | |
|---|---|---|---|---|
| 2,330,907 A | * | 10/1943 | Dodge | B64C 11/001 415/185 |
| 4,021,135 A | * | 5/1977 | Pedersen | F03D 1/04 290/55 |
| 4,321,005 A | * | 3/1982 | Black | F03D 3/02 415/123 |
| 4,720,640 A | * | 1/1988 | Anderson | F03B 13/083 290/43 |

(Continued)

FOREIGN PATENT DOCUMENTS

IT   WO 2007066207 A2 *   6/2007 ............. F03D 3/005

OTHER PUBLICATIONS

International Search Report Dated: Mar. 14, 2013 3 pages.
Written Opinion of the International Searching Authority Dated: Jun. 25, 2013 7 pages.

*Primary Examiner* — Eric Keasel
*Assistant Examiner* — Joshua R Beebe
(74) *Attorney, Agent, or Firm* — Hedman & Costigan, P.C.; James V. Costigan; Kathleen A. Costigan

(57) ABSTRACT

A wind machine with aerodynamic elements to concentrate and accelerate an wind flow entering from outside, said machine having a housing, with an air intake, a first section converging up to an element having a substantially spherical or cylindrical section, a second and a third section, downwind said first converging section, each of said first section, said second section and said third section causing said wind flow to contact said element which has a substantially spherical or cylindrical section substantially up to its median line, a first and a second auxiliary air intake, coincident with said median line of said element having a substantially spherical or cylindrical section, said element having a substantially linear portion, being downwind of said first and second air intakes, and having a fourth and fifth section after said third section.

5 Claims, 3 Drawing Sheets

(51) Int. Cl.
    *F03D 1/02*         (2006.01)
    *F03D 3/02*         (2006.01)

(52) U.S. Cl.
    CPC ..... *F05B 2240/133* (2013.01); *F05B 2240/14* (2013.01); *F05B 2240/215* (2013.01); *F05B 2250/5012* (2013.01); *Y02E 10/72* (2013.01); *Y02E 10/74* (2013.01)

(58) Field of Classification Search
    CPC . F03D 1/463; F03D 1/049; F03D 3/02; F05B 2240/917; F05B 2240/922; F05B 2240/98; F05B 2240/13; F05B 2240/133; F05B 2250/5012; F05B 2240/14; F05B 2240/215; Y02E 10/74; Y02E 10/22; F01D 1/02
    See application file for complete search history.

(56) References Cited

U.S. PATENT DOCUMENTS

| | | | | |
|---|---|---|---|---|
| 4,781,522 | A * | 11/1988 | Wolfram | F03D 1/025 415/1 |
| 5,464,320 | A * | 11/1995 | Finney | F03D 1/04 415/220 |
| 6,382,904 | B1 * | 5/2002 | Orlov | F03D 1/04 415/1 |
| 7,018,166 | B2 * | 3/2006 | Gaskell | F03D 1/025 415/4.3 |
| 7,538,447 | B1 * | 5/2009 | Berenda | F03D 1/04 290/55 |
| 2005/0019151 | A1 | 1/2005 | Bezemer | |
| 2007/0277501 | A1 | 12/2007 | Sorenson | |
| 2010/0060012 | A1 | 3/2010 | Reitz | |

\* cited by examiner

WIND MACHINE WITH AERODYNAMIC ELEMENTS TO CONCENTRATE AND ACCELERATE AN AEOLIAN FLOW ENTERING FROM OUTSIDE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Reference to a Microfiche Appendix

Not Applicable

BACKGROUND OF THE INVENTION

1) Field of the Invention

The present invention relates to a wind machine with aerodynamic elements to concentrate and accelerate an Aeolian flow entering from outside.

2) Description of Related Art Including Information Disclosed Under 37 CFR 1.97 and 1.98

As it is well known, wind power plays an increasingly more relevant role among renewable energies that can be exploited.

At present, technology is almost exclusively addressed to direct exploitation of speed of flows within an Aeolian field of the zone where the wing machine is placed.

Power that can be collected within an "Aeolian field" derived from the Betz formula:

$$E = \tfrac{1}{2} \varrho \, A v^3 (\beta \times t),$$

wherein, $\varrho$ is air density given as $Kg/m^3$, an area swept by passing rotor blades given in $m^2$ of wind flow, v is velocity of flow given in m/sec, $\beta$ is Betz coefficient ($\beta$ that can be readily obtained is $=0.4$), and t is time.

From the above formula, it is evident that the higher the parameters A, v and t are raised, the higher is the collected power.

Due to technological reasons, it is is preferred to keep the v factor low, within a range of 9-15 m/sec, and since the use is direct, said velocities are present only in mountain sites, throats and in open sea.

The V parameter acts on parameter A; recently, rotors have been realized with more than 120 m in diameter, thus requiring the design of wind machines with total dimensions of more than 100 m height, and Aeolian apparatus provided at a height of more than 50 m from ground, with unavoidable difficulties for designing, assembling and maintaining at such a great height, high costs for designing roads and for distributing energy produced, besides requiring necessary investments. Furthermore, a remarkable environmental impact is caused.

Parameter t is only a function of natural factors.

From the above, it is understood that known solutions are characterised by some disadvantages:

- nominal Aeolian field used for Wind machines having acceptable dimensions is included within the range 10 m/sec-13 m/sec. An exception is made for Wind machines having a large front dimension, where the range of the Aeolian field can be lowered to about 8 m/sec, which adversely affects the cost-advantages balance. For small Wind machines, a nominal positive Aeolian field is included within the range between 12 and 15 m/sec. All the above Aeolian fields are located in inconvenient zones (mountain ridges or hill zones/plain zones only in Northern areas).
- duration of above wind intensity is limited to a fraction of the total of hours available within a year (1 year=8760 hours). Said fraction depends on the geographical position (in Italy for example only on ridges of few mountain zones from Apennines to south, duration is about ⅛ of total hours/year), thus only for 1070 hours per year.
- construction of known Wind machines is very expensive, both due to rotor dimensions, which are at the higher value. To increase parameter A, rotors are presently designed with a diameter larger than 100 m (a=area–$100=7850 \, m^2$).
- rotors have their rotation axis at the end of a tower that, in case the rotor has a diameter of 100 m, the height of insertion of the rotor rotation axis is at least 70 m, thus the total dimension is at least 120 m from ground level. The rotor bearing structure must be designed to resist wind stresses, rotor thrust, and earthquakes.

Moreover, the visual impact, the hazards involved with the maintenance and repair of wind powered electric generators (with masses of 15/20 tons of nacelle-rotor group containing rotor axis, electric generator assembly, sensor assembly for orienting the rotor rotating about tower, etc.) pose significant problems.

The above problems exist independently of other disadvantages, such as the difficulty of transmitting the electric power generated by wind power to main transmission lines the necessity of building roads (to access large Wind machines), and constructing foundations necessary for tower construction.

In view of the above, it is an object of the present invention to design a wind machine permitting using Aeolian fields with low wind speeds (about 5 m/sec), i.e. Aeolian fields that can be found in many zones all over the world, and that are characterised by a duration of the wind much longer (from 4 to 5 times) than the above mentioned Aeolian fields, with a total number of about 5400 hour per year.

Another object of the present invention, is that of designing a wind machine having reduced dimensions (about 75% less than traditional wind machines), thus reducing: the environmental impact, risks for birds, risks deriving from earthquakes, maintenance and repair risks by positioning the electric generator assembly and all the electronics at ground level.

Still another object of the present invention is that of providing a wind machine that can be used in many different fields wherein said technology has never been used, e.g. automotive, nautical, or road and highway fields.

SUMMARY OF THE INVENTION

These and other results are obtained, according to the present invention, by a wind machine provided with a housing, having reduced dimensions within-which are ducts, converging and diverging wing profiles, etc. that are contained, as well as rotors or other wind devices suitable for collecting natural or, at the beginning, forced wind power, exploiting different elementary motions of fluid dynamics and not only rectilinear motion, as in the known solutions.

The housing of the wind machine according to the present invention is not a simple container, but is a rather complex interaction system, wherein air flows, which are differentiated into vector and scalar values, determine the results in which velocity field and earth gravity field values intervene. It can be said that the housing system as described in the above makes possible the collection of kinematic energy $1/2 lv^3 A$, as well as "earth gravity field" energy, using the well known formula:

$$V = \sqrt{\frac{2\Delta p}{l}}$$

Wherein, v is the velocity of flow induced by a pressure difference $\Delta p = P_{atm} - P_{static}$, according to induced flow direction, is a physical vehicle by which the energy of the earth's gravity acts on air molecules (all about the earth) is present. To give an intuitive connection, it can be imagined that the operation of the energetic transformation, compares with the transformation occurring in hydroelectric power plants where a water collection basin is at level h and an Δh of "gravity field" potential, wherein v is flow velocity of forced ducts and a physical vehicle to exploit gravity energy.

It is therefore a specific object of the present invention to provide a wind machine with aerodynamic elements to concentrate and accelerate an Aeolian flow entering from outside, said machine being characterized in that it is provided with a housing, with an air intake, a first section converging into an element having a substantially spherical or cylindrical section, a second and a third section, downwind of said first converging section, each section contacting said element having a substantially spherical or cylindrical section substantially up to its median line, a first and a second auxiliary air intake, coincident with said median line of said element having a substantially spherical or cylindrical section, said element having a substantially linear portion, downwind of said first and second air intake, a fourth and a fifth section, each one substantially reproducing the profile of said second and third sections, a third auxiliary air intake being provided coincident with said fourth and fifth sections; and a diverging channel, at the outlet of which a device exploiting said air flow is provided.

Preferably, according to the invention, said air flow entering through said main air intake is a natural flow, the wind machine being provided with means for orienting said wind machine with respect to the air flow direction, or an artificial air source.

Furthermore, according to the invention, the sequence of sections and of auxiliary air intakes between said converging section and said diverging section can be provided, in series one or more times.

Always according to the invention, said device exploiting the air flow can be a device provided with blades, or another kind of wind device with a horizontal or vertical axis.

Still according to the invention, said machine provides circular wings, in its front section, said wings having a suitable wing profile, with a positive or negative leading angle, causing a perturbation of "wind field", by curving the flow lines.

Furthermore, according to the invention, to reduce friction loss between molecules of air flow flowing within the circular channels, it is possible to reduce or eliminate the wing after the first wing, in order to reduce the contact area and limit the layer causing friction and, exploiting the natural curvature of "Aeolian field" flow lines of perturbation elements, behaviour of flow lines, i.e. their centre concentration would be similar to a fixed wall, without resistance losses.

BRIEF DESCRIPTION OF THE SEVERAL VIEWS OF THE DRAWINGS

Present invention will be described in the following in order to illustrate but not to limit the scope of the invention with particular reference to its preferred embodiments, making particular reference to the figures of the enclosed drawings, wherein.

DETAILED DESCRIPTION OF THE INVENTION

Figure 1:
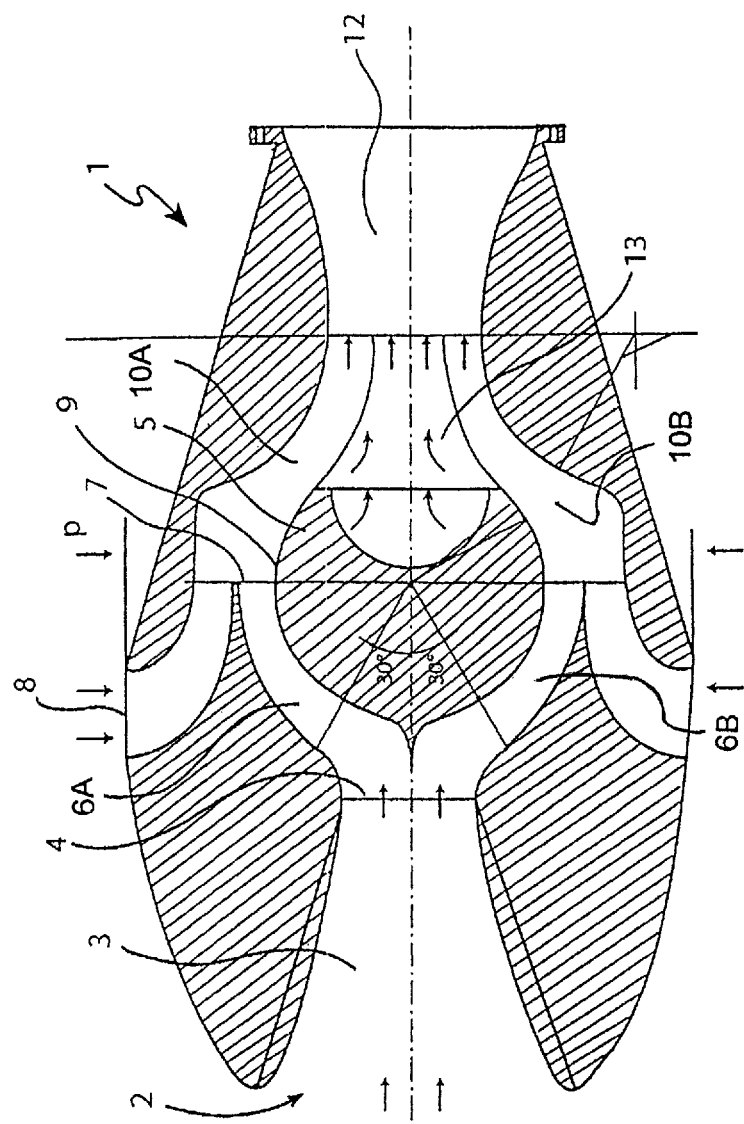
FIG. 1 is a section view of a wind machine according to the invention.
Figure 2:
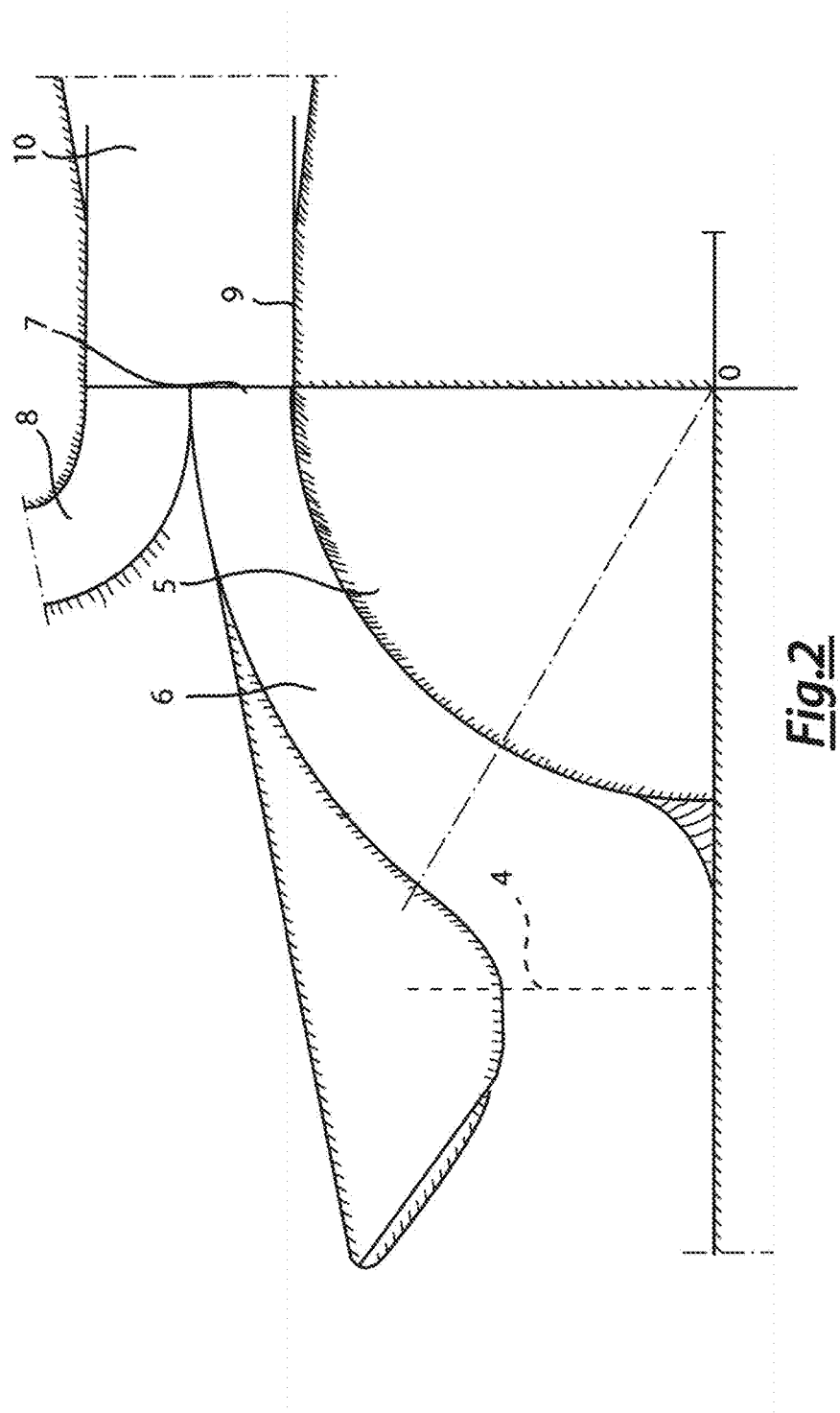
FIG. 2 shows a particular of housing of FIG. 1.
Figure 3:
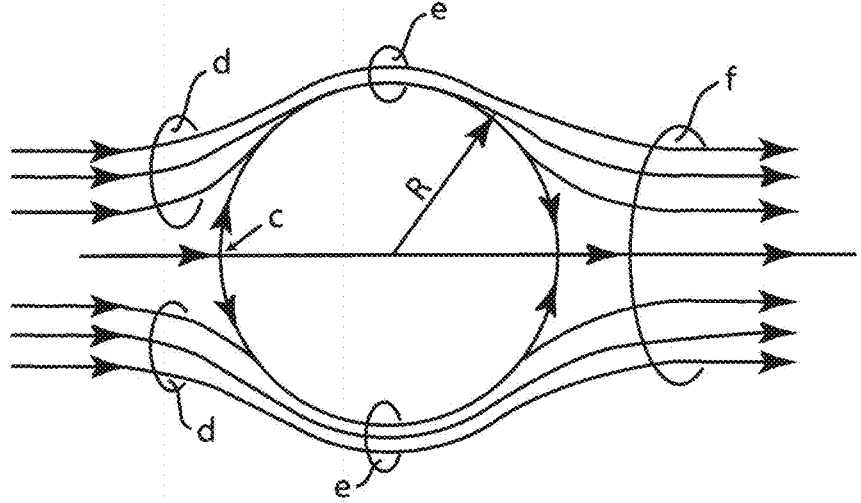
FIG. 3 schematically shows the flow of a fluid about a sphere.

Reference is made to FIGS. 1 and 2 of the enclosed drawings, that schematically show a housing, generally indicated by reference number 1, of a wind machine according to the invention.

Said housing 1 has an air intake 2, a first section 3 that converges into section 4.

In said section 4, flow is conveyed about a sphere-section (or cylindrical section) element 5 by second section 6A and third section 6B, up to section 7, where an auxiliary air intake 8 is provided.

After section 7, element 5 has a linear running run 9 which extends into a fourth section 10A and a fifth section in the same manner that second section 6A and third section 6B extends to section 7.

Coincident with said channel 10, a further auxiliary air intake is provided, up to diverging channel 12, ending coincident with section 13, where an Aeolian air flow user (not shown) is provided.

Preliminarily, it must be pointed out that the air flow in correspondence of air intake 2 can be a natural flow, in this case, the wind machine according to the invention is suitably oriented with respect to the natural air source, or an artificial air source (not shown).

A specific description and scientific explanation will be given in the following with respect to different arrangements of the wind machine according to the invention, underlining particular advantages obtained. The basic design principles according to the invention are valid for each one of the different arrangements, i.e. collecting the highest amount of air that can be obtained from a wind field, at the velocity of the outer field, thus reducing the pressure drop.

As stated above, in case a natural flow is provided, air intake 2 is oriented perpendicular to the wind field flow direction, due to the action of wind thrust on the vertical rudder and on the frame (not shown, since they are not a part of the present invention).

Air Flow entering air intake 2 with a mass flow $$A \times V\infty \times \varrho = Kg/sec$$

Wherein A is the intake area (m²), V∞ is the field velocity, $\varrho$ is the air local density.

Air mass is compressed within first section 3, according to Bernoulli formula $A_1/A_2=R_1$ Wherein $A_1$ is the efficient inlet area from first section 3, $A_2$ is the area of trailing edge area, $R_1$ is a first section 3 ratio.

In case the pressure drop is due to air friction along the walls or to the shape, aerodynamic losses are not present and the velocity at the trailing edge would be $$V\infty \times R_1 = V_1.$$

Thus, in correspondence of section 4, it would be $V_1 > V\infty$.

The law of a fluid flow along a sphere or along a cylinder applies along sections 6A and 6B, so that the velocity in correspondence of section 7 is, always not considering pressure drop, $3/2\ v_1$ for sphere and $2v_1$ for cylinder.

As already said, in correspondence of section 7, an auxiliary air intake 8 is provided.

On the basis of Bernoulli's law, a velocity V generates a negative pressure in flow motion, $$\Delta p = \tfrac{1}{2} \varrho\ V^2.$$

Thus, communicating ($P_{atm}$) with flow at $V_1$, in correspondence of rectilinear section 9, a flow air is obtained $$\Delta s \times V_1 = \psi s$$

wherein As is area of the channel communicating with the auxiliary air intake, $V_1$ is velocity of inducing flow, $\psi s$ is maintained flow until when $\Delta p$ with respect to atmosphere exists.

Housing 1 of the wind machine according to the invention can be comprised of a series of structures as described above.

It is observed that total flow air, at the end of the trailing edge of section 10 (or of series of converging sections) will have a velocity $v_1$, and will enter within diffuser throat 12 with a velocity $V_1 \times R_2$, wherein $R_2$ is ratio of area $A_2/A_f = R_2$.

Taking into consideration the pressure drop along ducts, and in any converging ducts, the total of the flows will be $\psi_1 + \psi_2 \ldots \psi_n = \psi_{total}$, and velocity within the throat will be: $V_R = \psi_r/A_f$, wherein $V_R$ is the throat velocity acting on rotor, and $A_r$ is diffuser throat area.

Always keeping in mind the Betz equation, concerning power that can be obtained from a flow current, having velocity V, passing through an area $A_R$ of rotor ($P = \beta \times \tfrac{1}{2} \varrho\ AV^3$), it is observed that the two basic variable parameters are cubic current velocity, and rotor area.

Increasing the velocity value from 5 m/sec to 20 m/sec, i.e. four times, parameter V varies from 125 to 8000.

The sole disadvantage of the design according to the invention (compensated by advantages obtained) is that the collection of a wind field is made within a housing, wherein air contacts walls and is delayed by friction with the same, due to a "limit layer".

Wind machines according to the invention can also be made a field air intake not-having a circular section, or by a device that multiplies inlet velocity.

In the first case (non-circular field air intake), dynamic intake surface of wing flow is geometrically different with respect to the circular one (e.g. it can have a square, rectangular, octagonal, ecc. cross-section).

In the present case, since wind machine provides element 7, and its accelerating effect, it is worthwhile observing the operation of the assembly, when it has a modified flow inlet in a portion of the housing intended to transform kinetic energy into mechanical energy.

In case a device having a vertical axis is used, it can be provided with a device known as a Panemone instead of a rotor.

A Panemone is essentially comprised of a disc rotating about an axis passing through its center. Wing portions with a suitable profile are fixed to the disc, where the wing portions have a longitudinal extension parallel to the rotation axis, the leading edge of which is hit by flow.

The operative principle of the wind machine according to the present invention is summarized as follows: As it is well known, all possible motion of a wind flow can be decomposed into four elementary motions: rectilinear, vortex, well and doublet motion.

Each one of said motions can be represented by a mathematical equation (Laplace equation), which is a linear differential equation valid for non-rotating elementary motions and incompressible fluid (a fluid is deemed incompressible up to a field velocity lower than Mach 0.2-0.3).

Juxtaposition of two or more elementary motions represents all of the possible motions.

Thus, the motion obtained is described by an equation solving an elementary motion equation system, and said equation is a Laplace equation, that linearly adds coordinates of elementary motion equations.

Usually, coordinate expressing elementary motion equations are Cartesian coordinate equations or cylindrical coordinate equations, or spherical coordinate equations.

The solution suggested according to the present invention is described above, and thus an apparatus taking a set dynamic flow from a wind field, having a set flow rate (i.e. $A \times V\infty$), having one or more intakes faced toward wind flow direction, processing flow(s) within housing, and using effects of elementary well and vortex motions, determines the inlet from a wind field opening, which is different with respect to a dynamic inlet, of air current within the housing, generated by pressure difference (atmospheric pressure of outer field) and depression generated within a current provided with velocity V.

In fact, according to the Bernoulli equation, total pressure within a fluid current is $P = P_1 + \tfrac{1}{2} \varrho\ v^2$ wherein $P_1$ is residual static pressure and $\tfrac{1}{2} \varrho\ v^2$ is current flow dynamic pressure.

For flows arriving from a natural wind field, it can be said that $P_{atm}$=atmospheric pressure.

Thus: $\Delta p = P_{at} - P_1 = \tfrac{1}{2} \varrho\ v^2$, wherein $\Delta p$ is a pressure drop acting within a conduit communicating the atmosphere with a flow having velocity v.

If a conduit from the atmosphere to flow is within the flow, an outflow (source) occurs with velocity $V = \sqrt{2\Delta p/\varrho}$ that will be maintained until when pressure drop will exist. $\Delta p = V$ (minus the viscosity losses).

If a conduit is outside the flow, an opposite flow (well) will be obtained.

Said flows added to flows coming from dynamic intakes, are additive with each other within a volume obtained in the housing and indicated as "mixing chamber", wherein sum up of motions occurs, as demonstrated by Laplace equations.

Now, attention is drawn to a third elementary motion, vortex, as described in International Patent Application PCT/IT2009/000348, having as title, "Improved Aeolian silos", of the same inventor of the present application.

Vortex motion occurs (according to the specification of the above application) within a suitable volume of housing where dynamic flow is sent to a circular chamber, and a vortex filament is realised which, on the basis of the Biot-Savart law, determines induction of a fluid flow perpendicular to the vortex circulation.

In this case two induced flows and dynamic flows are summed up within mixing chamber before reaching a rotor.

An additional effect according to the present invention is that which is obtained alone (or in addition to those described) by deformation of a velocity potential field (and pressure) that is obtained by putting a body having every shape within the bed of a rectilinear flow with velocity V.

Some theoretical considerations must be done on an accelerating "diverging-converging-diverging" conduit having virtual, rather than physical, walls in order to reduce pressure losses due to friction and shape coefficient. Said solution is particularly suitable for low velocity airborne flows.

Efficiency of a "flow intake-converging-static auxiliary intakes-diverging" geometry, in the theoretical situation of a hypothetical incompressible and not viscous fluid, is a direct function of the Bernoulli theorem, because the fluid inlet velocity is related to the dynamic intake (i.e. perpendicular to the inlet of converging throat according to convergence ratio).

Here, a static intake from the atmosphere results in a supplemental flow that enters as a function of the pressure difference between atmospheric pressure and the static pressure of the throat flow according to the Bernoulli formula: $P_{atm}=P_1s+\frac{1}{2}\varrho V_1^2$, i.e. $Ps=P_{atm}-\frac{1}{2}\varrho -V_1^2$, being $V_1=V\infty \times R$, wherein R is convergence ratio between area of dynamic intake and throat area. Velocity of supplemental flow is:

$$V_1 = \sqrt{2\Delta p/\varrho} \quad \Delta p = \frac{1}{2}\varrho V_1^2$$

thus $$V_1 = \sqrt{2(\frac{1}{2}\varrho V_1^2)/\varrho} = \sqrt{V_1^2} \quad V_1 = Vs$$

The above analysis is valid if the inflow of a supplemental flow does not cause an increase of flow pressure.

It is evident that a repeated geometry would cause a remarkable increase of final flow rate. Having a final device for transforming energy (according to Bernoulli) and without considering losses, would result in a $Vn=P_1+P_2+Pn$/final area much higher than $V\infty$, with a flow rate n/r times larger than that of the initial air intake.

Under the energy balance point of view, the final sum of inlet energy within the flow from various intakes is:

$$\varrho A_d \times \frac{1}{2}V^3 + \varrho A_1 \times \frac{1}{2}V^3 + \varrho A_n \times \frac{1}{2}V^3 = \text{Total}$$

This is not valid in the real world, since friction along walls and losses due to convergence within converging conducts determines a reduction of air velocity at the throat outlet for each diffuser, so that the velocity of auxiliary flows, being a function of local pressure difference, is remarkably lower.

Notwithstanding the above, a set increase of flow rate and final velocity is obtained. From the above considerations, it is reasonable to conclude that such a system will allow for the full exploitation of the possibilities offered by the above scheme, while trying to reduce most losses.

It has been observed that, if every body is placed within a wind field, e.g. a rectilinear stationary field having a velocity V, a field deformation will occur around said body, so that flow lines, deform their trajectory from rectilinear into curvilinear, going around the body.

Curving energy making flow lines are the lines resulting from the shock of fluid arriving within a stagnation zone on which flow lines hit.

Energy delivered is conferred to the surrounding flows, thus increasing their energetic level, thus pressure (on the basis of Bernoulli, if velocity is annulled, pressure increases), and a light negligible temperature increase occurs.

If local pressure increases, $\Delta p$ increases, and thus velocity with which air surrounding body flows beyond the body.

A stagnation point of the perturbation body thus behaves as a source, the motion of which overlaps with rectilinear motion of the arriving flow.

Resulting motion can be thus described as a juxtaposition of equation of two elementary motions: rectilinear and source motions.

Describing the two motions by spherical coordinates, using linear differential equations (Laplace equation), it is obtained that the resulting equation is another linear differential equation.

The above has been demonstrated, described and calculated by Rankine in his famous study of oval shape (Rankine Oval), comprised of a plurality of rectilinear, source, well, flows, said two flows originating from an axis parallel to the rectilinear flow, having the same force.

Rankine demonstrates that total flow obtained from 3 motions determines a separate volume, contained within a wind field, without dispersion outside resulting flow, as if it is enclosed within a rigid housing. The above means that losses are very low and are a function of the velocity gradient among line flows, said gradient being limited for curvilinear trajectories, and thus not existing limit layer so with a velocity equal to 0, losses can be ignored.

In the above discussion, it has been disclosed that an air inlet in the described geometry can be considered as a flow obtained from a "rectilinear" motion juxtaposed to a "source" motion. To realize Rankine geometry, it is necessary to create a well flow.

Said well flow is the opposite of the source flow, with flow lines entering within the well flow.

Flow of the rectilinear field, in its central trajectory, enters within the set area throat of a diverging conduit.

Taking first into consideration a diverging conduit with a length l and rectilinear generatrix inclined of an angle $\alpha<7°$, with a monotonic increase of area, lacking friction and losses, air volume entering within a second passes through cone, behaving as a piston, but in view of the increase of area for every "x" path, causes a space:

$$dv = (dr/r)^2 \times \pi \cdot dx,$$

Said volume must be filled in by a "dv" adding to standard flow rate $\pi R^2 \times Vr$ entering within diffuser throat, and this is possible only by a passage velocity increase.

Velocity increase within a diffuser throat is only possible with an increase of pressure difference $\Delta p$ between inlet and throat sections.

Thus, the intake of diffuser is a well force, and juxtaposition of field rectilinear motion with well motion, closes the Rankine oval.

Bearing in mind that the Rankine oval behaves as if the resulting flow between a rectilinear field motion and source and well motions, is contained within a rigid housing, and there are negligible losses, said geometry behaves as a virtual converging system.

The present invention has been described for illustrative, but not limitative purposes, according to its preferred embodiments, but it is understood that variations and/or modifications can be introduced by those skilled in the art without departing from its scope as defined in the enclosed claims.

The invention claimed is:

1. A wind machine comprising aerodynamic elements that concentrate and accelerate a wind flow entering from outside, wherein said wind machine is provided with a housing, with a main air intake, a first section converging up to an element having a substantially spherical or cylindrical section, a second and a third section, downwind said first converging section, each of said first section, said second section and said third section causing said wind flow to contact said element having a substantially spherical or cylindrical section substantially up to its median line, a first and a second auxiliary air intake having first ends arranged substantially perpendicularly with regard to air flow in said main air intake, and a second ends coincident with said median line of said element having a substantially spherical or cylindrical section, said element having a substantially spherical or cylindrical section also having a substantially linear portion, downwind said first and second air intakes, a fourth and a fifth section, each one substantially reproducing the profile of said second and third sections and a diverging channel that expands in cross-section after said fourth and fifth sections, at the outlet of which a device exploiting said wind flow is provided.

2. The wind machine comprising aerodynamic elements that concentrate and accelerate a wind flow entering from outside according to claim 1, wherein said wind flow entering through said main air intake is a natural flow, the wind machine being provided with means for orienting the wind machine with respect to wind flow direction.

3. The wind machine comprising aerodynamic elements that concentrate and accelerate a wind flow entering from outside according to claim 1, wherein said wind flow entering through said main air intake is an artificial source.

4. The wind machine comprising aerodynamic elements that concentrate and accelerate a wind flow entering from outside according to claim 1, wherein the sequence of sections and of auxiliary air intakes between said converging section and said diverging section are repeated beyond the first sequence, in series, at least once.

5. The wind machine comprising aerodynamic elements that concentrate and accelerate a wind flow entering from outside according to claim 1, wherein said device exploiting the wind flow is a device provided with blades, or a wind device with a horizontal or vertical axis.

* * * * *